F. A. PURCHAS & A. C. LA MAY.
PAPER BOX MAKING MACHINE.
APPLICATION FILED MAY 11, 1907.

982,744.

Patented Jan. 24, 1911.

Witnesses:
Lottie Wood.
Osborne F. Gurney

Inventors
Fred A. Purchas
and
Arthur C. La May
By Wm. H. Cooley, Atty.

F. A. PURCHAS & A. C. LA MAY.
PAPER BOX MAKING MACHINE.
APPLICATION FILED MAY 11, 1907.

982,744.

Patented Jan. 24, 1911.
6 SHEETS—SHEET 3.

WITNESSES:

INVENTORS:
Fred A. Purchas
and
Arthur C. La May
BY W. H. Cooley ATTY

F. A. PURCHAS & A. C. LA MAY.
PAPER BOX MAKING MACHINE.
APPLICATION FILED MAY 11, 1907.

982,744.

Patented Jan. 24, 1911.
6 SHEETS—SHEET 6.

WITNESSES:
Osborne A. Gurney
Louise Frey

INVENTORS:
Fred A. Purchas
and
Arthur C. La May
BY Wm H. Cooley
ATTY.

UNITED STATES PATENT OFFICE.

FRED A. PURCHAS, OF McGRAW, AND ARTHUR C. LA MAY, OF ROCHESTER, NEW YORK.

PAPER-BOX-MAKING MACHINE.

982,744.  Specification of Letters Patent.  Patented Jan. 24, 1911.

Application filed May 11, 1907. Serial No. 373,138.

*To all whom it may concern:*

Be it known that we, FRED A. PURCHAS, of the village of McGraw, county of Cortland, and State of New York, and ARTHUR C. LA MAY, of the city of Rochester, county of Monroe, and State of New York, citizens of the United States, have invented a new and Improved Paper-Box-Making Machine, of which the following is a specification.
The purpose of our present invention is to provide a machine for rapidly and economically constructing the egg carrier described in United States Patent No. 802884, dated October 24, 1905, to Fred A. Purchas.
The present invention relates to means for treating the blanks for the egg carrier such as described in the above mentioned patent, and securing thereto the partitions between the folding sections of such blanks, and comprises the following features, viz:—means for feeding the blanks, one at a time, to a bed or carriage in position to be advanced by suitable feeding mechanism to a folding mechanism adapted to fold the side and bottom walls of the carrier, while the central and connecting members may be retained on the plane surface of the bed. From this folding mechanism they are fed to the pasting, feeding and clamping mechanisms for attaching the cell partitions, and from which they are delivered from the machine as completed egg carriers.

In our machine we prefer to make use of a well known blank feeding mechanism, by means of which the blanks are fed in flat form one at a time to the bed of the machine which comprises a continuous bar having its top surface, preferably, arranged at right angles with the side surfaces extending downwardly therefrom. The width of this top surface is equal to the combined width of the folding cover sections of the egg carrier which when filled with eggs comprise the closure for the egg cells.
The accompanying drawings illustrating our invention are as follows:—

Fig. 4 is a rear end view with the parts above the paste pot removed.
Figs. 9 and 10 are vertical sectional views of the jaws and the coöperating bed piece and the cutting knives taken along the line $x^2$—$y^2$ of Fig. 16, which shows a top view of the left hand one of such jaws.
In Fig. 9 the jaws are shown as removed from the coöperating bed piece to permit the insertion of the partition strips between the continuous side walls of the blank, such partition strips and blank being shown in dotted lines, while in Fig. 10 the jaws are shown as having been advanced to clamp the side walls of the blank together with the partitions between them which have been severed from the strips thereof by the forward action of the jaws carrying the movable members of the cutting mechanism.
Fig. 11 shows the blank folding mechanism in its uppermost position, while
Fig. 12 shows this mechanism in its lowermost position, as having operated upon and folded a blank.
Fig. 13 is a top view of the bed piece and the members cooperating therewith to receive the blank as operated upon by the folding mechanism shown in Figs. 11 and 12.
Fig. 14 is a view from the under side of one of the fixed members of the cutting mechanism.
Fig. 15 shows in side view the left hand jaw and its actuating mechanism and in operative position in relation thereto there is seen the bed piece of the machine in vertical section.
Fig. 16 is a top or plan view of the left hand jaw.
Fig. 17 shows the mechanism at the lower end of each pair of supporting rods for lifting the partition pasting and feeding mechanism to permit the insertion thereunder of a blank over the bed piece.
Fig. 18 is a top or plan view and Fig. 19 is a side view of the scoring rolls.
Fig. 27 is an end view and Fig. 28 a partial plan view of the first set of folding rolls located immediately beneath the scoring rolls, while
Fig. 29 is a plan view and Fig. 30 is a partial side view of the final folding rolls located beneath the last mentioned rolls.
Fig. 31 shows in sectional view a partition strip as acted upon by these last mentioned rolls.

Similar letters refer to similar parts throughout the several views of the drawings.

Figures 1, 5, 6:
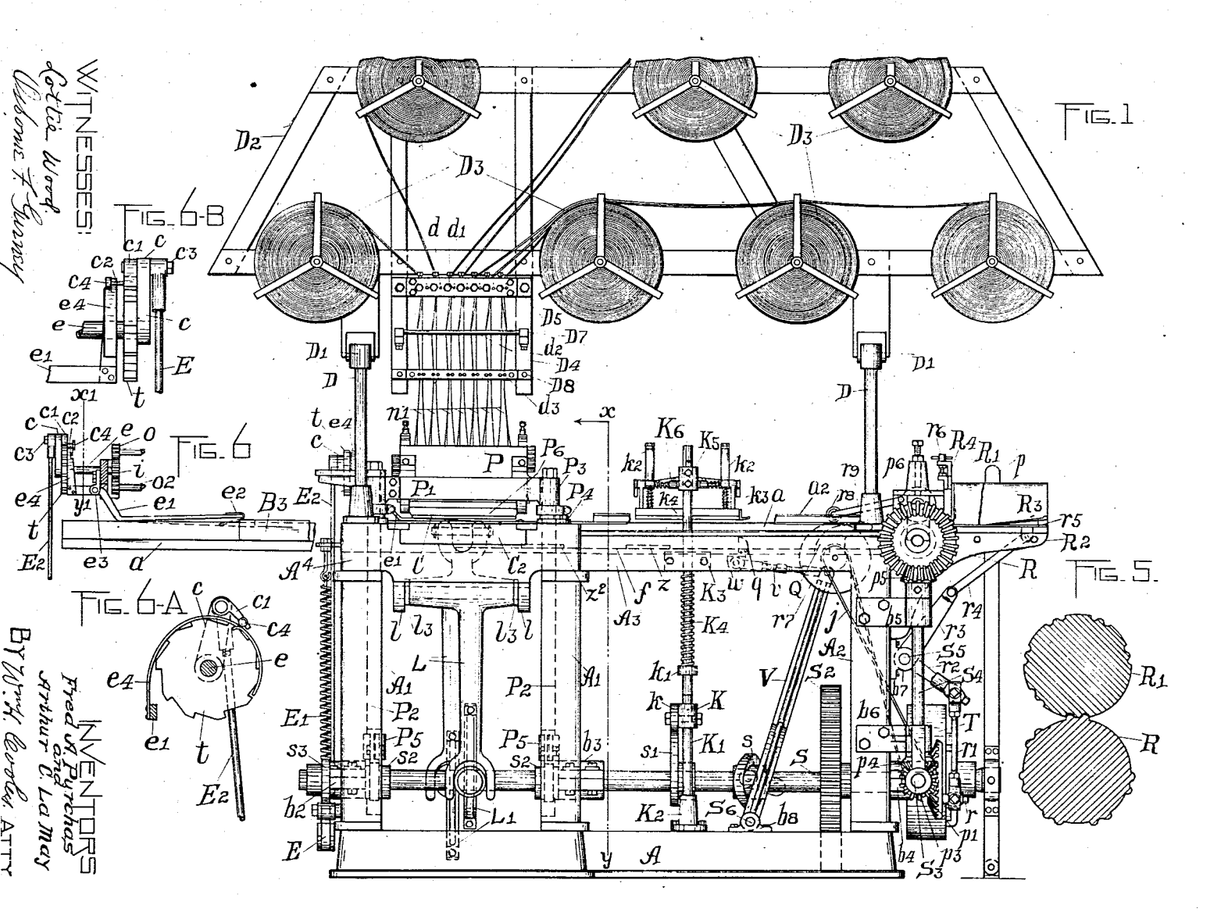
Figure 1 is a side view of the machine.
Fig. 5 is a sectional view of the corrugated feed rolls.
Fig. 6 shows a detail of the clutch mechanism for actuating the partition strip feed rolls when engaged by a blank. Fig. $6^A$ is a sectional view of the parts seen in Fig. 6, taken along the line $x^1$—$y^1$ with all parts to the right of such line removed, but not engaged by a blank. Fig. $6^B$ is an enlarged view of the parts of the clutch mechanism as seen from the side opposite to that shown in Fig. 6.
Figures 2, 3, 7, 8:
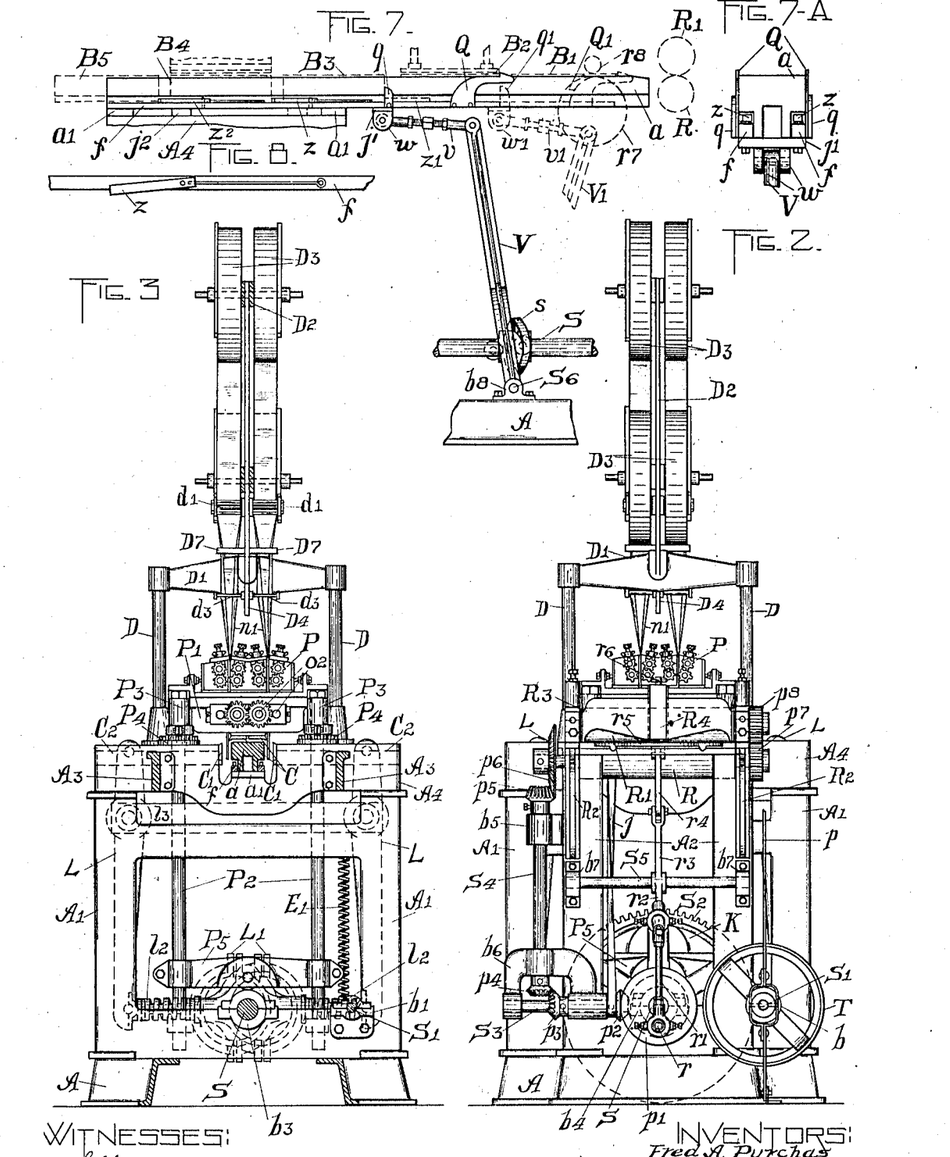
Fig. 2 is a front end view.
Fig. 3 is a sectional view taken along the line $x$—$y$ of Fig. 1, with all parts to the right of said line removed.
Fig. 7 shows diagrammatically the blank feeding mechanism in its different positions and the correspondingly different positions for the blank. In this figure only the center bed piece is seen, in connection with the mechanism for feeding the blanks thereover. Fig. $7^A$ is an enlarged view of the parts seen in the upper portion of Fig. 7 and as viewed from the right.
Fig. 8 is an enlarged view of a part of the feeding mechanism, as will be explained.
Figures 4, 9, 10, 11, 12, 13, 14, 15, 16, 17:
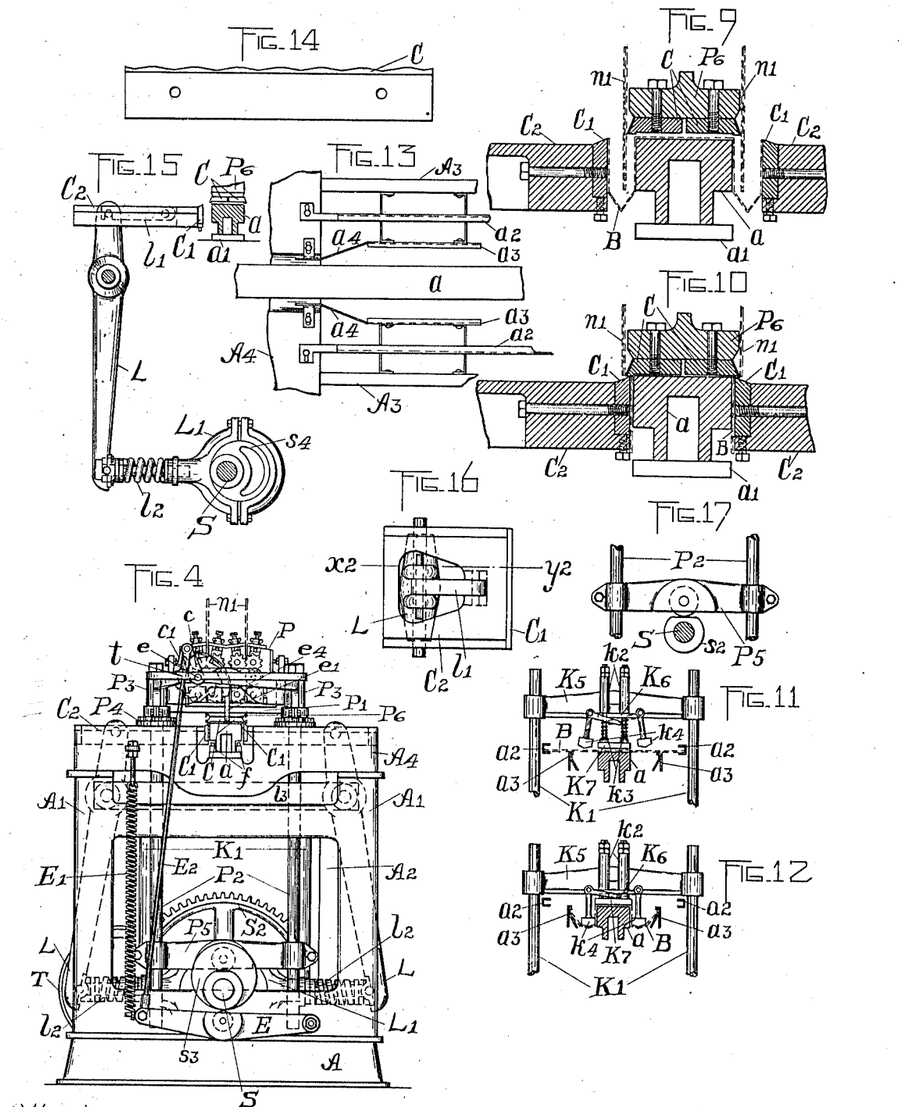

Referring to the drawings,—A is a base piece extending underneath the machine throughout its entire length. Resting upon and secured to this base A are seen, at the rear, four standards $A^1$ and at the front two standards $A^2$, the latter connected at their upper ends by a suitable web and each having cast integrally therewith a parallel horizontal member $A^3$ secured to the square frame-like member $A^4$ resting upon and secured to the upper ends of the standards $A^1$. Extending from the front to the rear and in the center laterally of the upper frame work of the machine is seen a continuous bed piece $a$, supported at the rear end, as seen in Figs. 3 and 4, in a depression in the lateral member of the frame work $A^4$, and supported at its front end upon the connecting member between the standards $A^2$ and the horizontal members $A^3$. The bed piece $a$ has its exterior surface tooled except on the under side and is cast hollow, as shown. Carried by the right hand standard $A^2$, as seen in Fig. 2, is a bearing $b$ for a shaft $S^1$, upon the front end of which is seen a pulley T normally free to revolve on such shaft $S^1$ except when clutched thereto by a suitable clutching mechanism, which may be of any approved form, and operable by means of a handle $p$. The other bearing for the shaft $S^1$ is seen at $b^1$ in Fig. 3 near the lower end of the standard $A^1$. On the shaft $S^1$ is secured a spur gear not seen but immediately behind, concealed by and meshing with the spur gear $S^2$ rigidly secured upon the shaft S, which has suitable bearings $b^2$, $b^3$ and $b^4$, carried by cross arms between the standards $A^1$ and $A^2$. On the front end of the shaft S is secured a bevel gear $p^1$ meshing with a gear $p^2$ on the right hand end, as seen in Fig. 2, of the shaft $S^3$ and carrying near its center a bevel gear $p^3$ meshing in turn with a bevel gear $p^4$ on the lower end of the shaft $S^4$, having on its upper end a bevel gear $p^5$ meshing with a bevel gear $p^6$ on the left hand end, as seen in Fig. 2, of the lower feed roll R. On the right hand end of this roll R is seen the spur gear $p^7$ meshing in turn with the spur gear $p^8$ on the right hand end of the feed roll $R^1$. Such rolls R and $R^1$ are corrugated, as shown in sectional view in Fig. 5 and have suitable bearings carried by extensions $R^2$ secured to the frame work $A^2$. A bearing $b^5$ for the upper end of the shaft $S^4$ is secured to the left hand standard $A^2$ near its upper end, while a suitable yoke $b^6$ secured near the lower end of standard $A^2$ carries the bearing for the lower end of the shaft $S^4$ and also bearings for the shaft $S^3$. On the front side of the gear $p^1$ is seen a crank $r$ articulating by a universal joint with the lower end of a connecting rod $r^1$ having its upper end connected by a universal joint with the arm $r^2$ on rock shaft $S^5$ supported in bearings $b^7$ carried by the standards $A^2$, as seen in Figs. 1 and 2, and having an arm $r^3$ extending obliquely upward therefrom, and connected by a link $r^4$ with the reciprocating feeding carriage $r^5$ working in slidable guideways therefor carried by the extensions $R^2$. This carriage $r^5$ is arranged to receive the blanks and may be of any well known construction carrying any suitably formed ledge or projection adapted, when at its extreme forward position, to engage the rear edge of the lowermost blank B, in a pile of such blanks placed in the receptacle therefor $R^3$, in such a way as to force the lowermost blank into engagement between the rollers R and $R^1$, while an adjustable guard or fence $R^4$, which may be of any well known type, is arranged just in front of the rollers R and $R^1$ and adjustable by means of an adjustable screw mechanism $r^6$ to permit of the passage thereunder of only one of the blanks B at a time. The rolls R and $R^1$, as indicated, are provided with coöperating grooves and teeth adapted to corrugate the blanks transversely, for the purpose of stiffening them, as they pass between such rolls. The rolls R and $R^1$ deliver the blanks to the feed rolls $r^7$ carried upon the shaft extending under the bed piece $a$ and revoluble in suitable bearings therefor, not seen, in the members $A^3$ of the frame. Of these rollers $r^7$ there is one each side of the bed piece $a$ and they coöperate with the roller $r^8$ held in frictional engagement therewith by means of its bearings in the swinging frame $r^9$. The shaft carrying the rollers $r^7$ has thereon a pulley to which motion is communicated from the shaft $S^3$, by means of the belt $j$, as shown in Figs. 1 and 2.

Figures 40, 41:
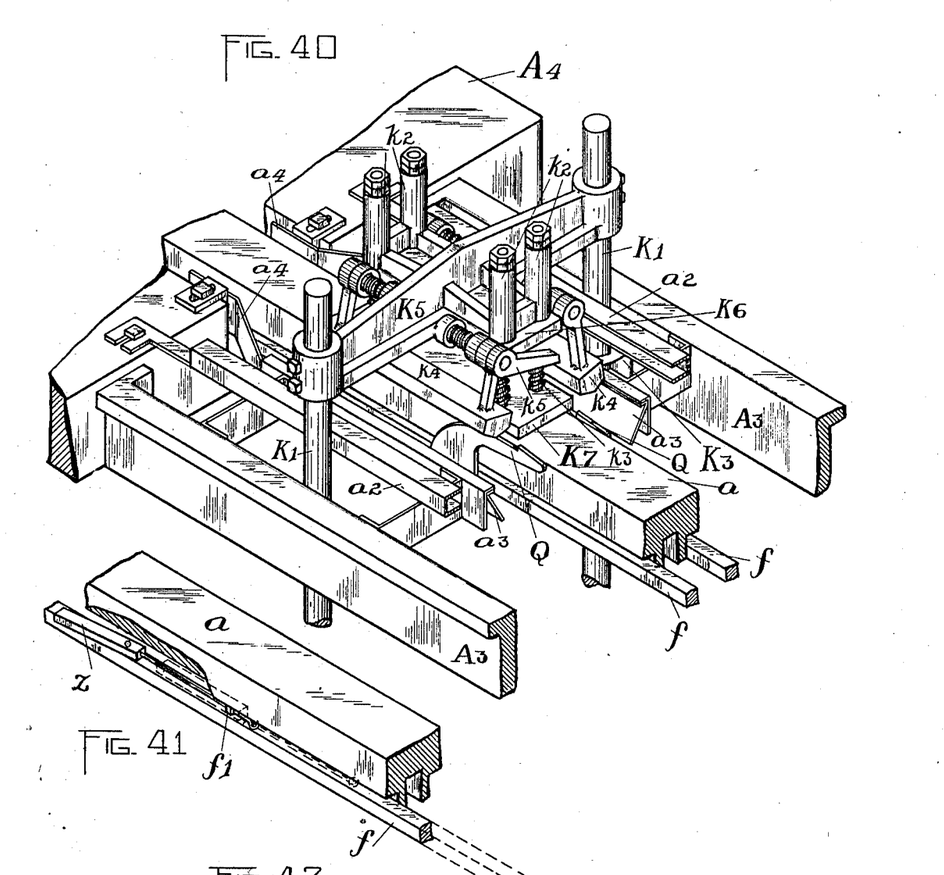
Fig. 40 shows in perspective the blank folding mechanism.
Fig. 41 is a similar perspective view of the mechanism for actuating the latches $z$ when the bars $f$ are moved to their extreme forward position in order to move them out of the path of the plungers for folding the blank.

Refer now to Figs. 7 and 7$^A$. In Fig. 7 there is also shown diagrammatically the blank advancing mechanism and the positions of the blanks relative to other mechanism of the machine acting thereon for each stage of the advancement of such blank by the mechanism to be described. On the shaft S is seen a cam $s$. Supported in bearings $b^8$ on the base A is seen a rod $S^6$ carrying the lower ends of the inverted Y-shaped lever V, the upper end of which is connected by a link $v$ with the downward projecting ears $w$ carried by the plate $j^1$ extending under the bed piece $a$. The cam $s$ engages between two rollers, one on each side thereof, carried by the lever V and thereby reciprocates the same. The bed piece $a$ has downward extensions $a^1$ adapted to support the main part of such bed piece between such extensions above the depressed central portion of the frame work $A^4$ to permit the cross piece $j^2$ to freely slide upon the frame $A^4$ and beneath the bed piece $a$. On the upper side of the cross pieces $j^1$ and $j^2$ is secured, on each side of the bed piece $a$, a bar $f$. To the bars $f$ are secured fingers Q and $q$ and front and rear latches $z$—$z^2$ respectively, which are shown in full lines at their extreme left hand positions and at their extreme right hand positions in dotted lines at $Q^1$, $q^1$ and $z^1$ respectively, while the extreme right hand position for the rear latch $z^2$ is coincident with the left hand position for the latch $z$, for which latter positions the lever V and connecting link $v$ and ears $w$ are moved to the positions therefor indicated in dotted lines respectively at $V^1$, $v^1$ and $w^1$. The finger or latch Q at its extreme right hand position engages the rear end of a blank, when in the position shown in dotted lines at $B^1$, and forces the same to the position shown at $B^2$ immediately under the folding mechanism, while for this same position of the parts the finger or latch $q$, shown at $q^1$, engages the front edges of a folded blank in the position indicated in dotted lines at $B^2$ and forces the same to the position indicated in dotted lines at $B^3$, upon the swinging of the arm V to its full line position. For the right hand position of the parts above mentioned the forward fingers $z$ on the bar $f$ engage the rear edge of a folded blank at $B^3$ and on the movement to the left of the lever V force such blank to the position $B^4$ under the pasting and partition feeding mechanism. The rear finger $z^2$ at the left hand end of the bars $f$, when the parts are in their extreme right hand position, is indicated at $z$, being coincident with the left hand position of the forward finger $z$ and adapted to engage the rear edge of a completed cell case or egg carrier, and upon the movement to the left of the lever V eject the same from the machine, moving it to the position indicated at $B^5$. Thus in its progress through the machine, the blank is delivered by the feed rollers R and $R^1$ to the rollers $r^7$ and $r^8$ and engaged first by the fingers Q, then by the fingers $q$, then by the forward finger $z$ and then again by the rear finger $z^2$, by means of which it is ejected from the machine. When the lever V is at its extreme forward position, the forward fingers $z$ on the bars $f$ would normally occupy a position in the pathway of the plungers of the folding mechanism, and for this reason such forward fingers $z$ are arranged to be spring actuated and when in their forward position are actuated by suitable engaging pins $f^1$ as seen in Fig. 41, in the pathway thereof to throw them inwardly against the bed $a$ and out of the pathway of the plunger of the blank folding mechanism.

The blanks such as B are delivered in a flattened out condition underneath the folding mechanism which will now be described, reference being made to Figs. 1, 11, 12, 13, and 40. On the shaft S is seen a cam $s^1$ arranged to engage a roller $k$ carried by a cross arm K extending between and secured to two rods $K^1$ each slidable at its lower end in a guide $K^2$ secured upon the bed piece A and at its upper end in a suitable guiding member $K^3$ secured on the inside of the frame $A^3$. Springs $K^4$ engaging at their upper ends the under side of the members $K^3$ and at their lower ends adjustable collars $k^1$ on the rods $K^1$, serve to keep such rods in their lowermost positions permitted by the position of the cam $s^1$. A cross piece $K^5$ is adjustably secured to and extends between the upper ends of the rods $K^1$.

The plate $K^5$ carries extensions $K^6$, as seen in Fig. 1, extending upwardly from each of which is seen two tubular guideways $k^2$, in which are arranged to slide the spring actuated rods $k^3$, all four of which rods $k^3$ are secured at their lower ends to a following plate $K^7$, which, under the influence of the springs encircling these rods, $k^3$, is held with yielding pressure, on the downward stroke of the folding mechanism, upon the upper surface of the blank thereunder and operates to clamp the same firmly down upon the bed piece $a$, while on such downward stroke of the folding mechanism the plungers $k^4$ pivotally carried by the extensions $K^6$ on the cross piece $K^5$, are forced downwardly between the bed piece $a$ and the folding arms $a^3$ each side thereof. These folding arms are indicated in plan view in Fig. 13. They are supported upon brackets extending inwardly from the side members $A^3$ of the frame and have connected to their rear ends plates $a^4$ calculated to still further fold the side walls of the blank together so that the same will pass within the space therefor between the bed $a$ and the sides of the opening in the frame work $A^4$. Suitably grooved guiding members $a^2$ are provided, as indicated in Figs. 11, 12, 13 and 40 to insure that the blank is guided so that its center shall lie over the center of the bed $a$ during the folding operation. These guiding members are secured at their forward ends to the lateral connecting member between the members $A^2$ and $A^3$ on each side of the machine and at their rear ends to the frame work $A^4$. The plungers $k^4$ are secured upon spring actuated rods, as indicated, having their bearing rotatably supported in the cross arm $K^5$, and the springs shown as encircling such rods tend normally to hold the plungers in the positions indicated in Figs. 11 and 40. Each of these plungers $k^4$ carries an inwardly extending arm $k^5$, that one on the left hand plunger $k^4$ only being seen in Figs. 11, 12 and 40, and such arms $k^5$ are adapted, when the folding mechanism is in its lowermost position, to engage the upper surface of the plate $K^7$, yieldably supported from the cross arm $K^5$ in the manner clearly indicated and already described, to swing such plungers inwardly on their pivotal supports as indicated in Fig. 12, folding the portions of the blank each side of the bed piece $a$ downwardly between such bed piece and the folding arms $a^3$, and upon the upward or return stroke of the folding mechanism, they again assume the positions indicated in Figs. 11 and 40, the plungers $k^4$ being released from engagement with the blank before the clamping plate $K^7$ is raised from the blank B. This is in order that the blank can be in no way displaced by the return of the folding mechanism. Upon the return of the folding mechanism to its uppermost position, the front edge of the blank is engaged by the finger or latch $q$ and moved, by the operation of the lever V and its connections, to the position indicated at $B^3$ in Fig. 7, from which position it is moved to the position indicated at $B^4$ in Fig. 7, and underneath the partition pasting and feeding mechanism by the next operation of this lever V.

Figures 18, 27, 28, 30, 31:
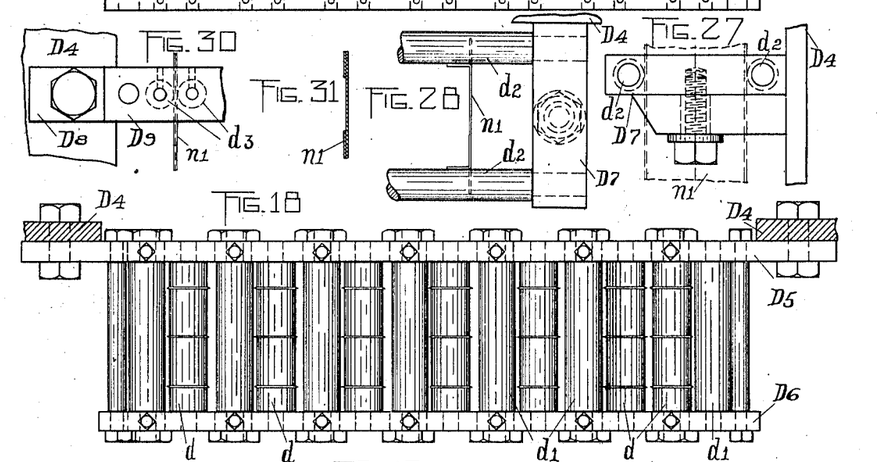
Figure 19:
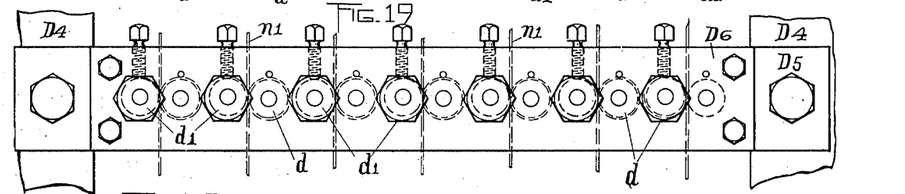
Figure 20:
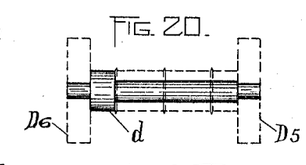
Fig. 20 is a side view of one of such scoring rolls and Fig. 21 is a view of a partition strip as scored thereby, the vertical lines in Fig. 21 showing the scoring lines and the marginal edges of the partition strip.
Figure 21:
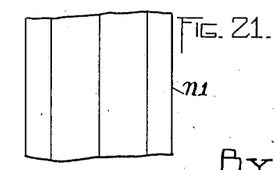
Figure 22:
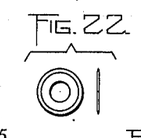
Figs. 22, 23 and 24 show details of the scoring rolls, as will be explained.
Figure 23:
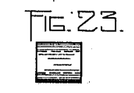
Figure 24:
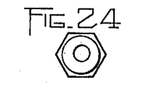
Figures 25, 26:
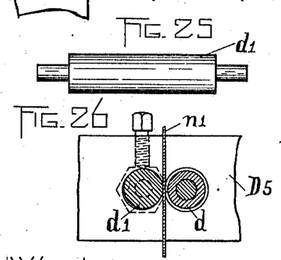
Fig. 25 is a side view of one of the plain rolls used in connection with the scoring rolls.
Fig. 26 shows in section a scoring roll and its coöperating plain roll with a portion of a partition strip being operated upon between them.
Figure 29:
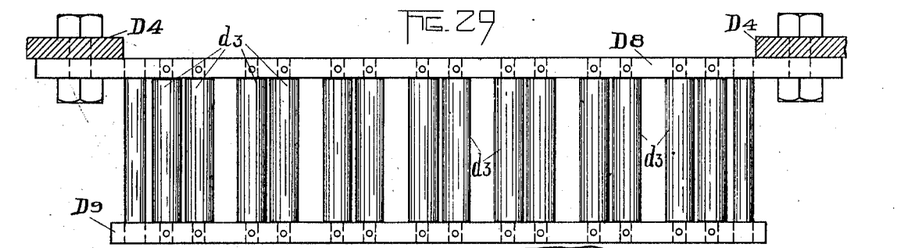

Extending upwardly from and supported by the frame work $A^3$ and $A^4$ of the machine are seen four standards D connected across the top by means of cross arms $D^1$ having upward extensions, on which there is supported the frame work $D^2$ for carrying the partition strip rolls and the partition strip folding mechanism therefor. On each side of the frame work $D^2$ there extends studs for receiving the rolls $D^3$ of the partition strips. From this frame work $D^2$ there extends downwardly on each side thereof two plates $D^4$. To these plates $D^4$ there is secured, first, a plate $D^5$ from which, by means of studs, as indicated in Figs. 18 and 19, there is supported parallel therewith the plate $D^6$, such plates $D^5$ and $D^6$ constituting the bearing plates for revolubly supporting a series of scoring rollers $d$ sectionally constructed in the well known way, as indicated in Figs. 20, 22 and 23, and coöperating with each one of which is also seen a pressure roller $d^1$, such rollers may preferably be adjustably supported in any well known way, as indicated in diagram in Figs. 18, 19 and 26. The hexagonally headed cylinders $d^4$ are revoluble in holes therefor in the plates $D^5$ and $D^6$ and have therein bearings for the ends of the rollers $d^1$ eccentrically located and such hexagonally headed cylinders $d^4$ are held in any desired position of angular adjustment in the manner indicated by means of machine screws threaded in the plates $D^5$ and $D^6$. Beneath the plates $D^5$ and $D^6$ carrying each set of scoring rolls there are supported two bars $D^7$ comprising the bearings for a pair of coöperating folding rollers $d^2$ extending longitudinally of the machine at right angles with the direction of the scoring rollers $d$, the arrangement and method of supporting such rollers $d^2$ being seen in Figs. 27 and 28, and in each of which figures as well as also in Fig. 19, the location and condition of a partition strip is indicated at $n^1$, these rolls $d^2$ serving, as indicated, to fold the attaching flaps of the partition strips at right angles with the planes of the strips. Beneath these rollers $d^2$ there extends longitudinally of the machine and secured to the bars $D^4$ a bar $D^8$ from which and parallel therewith, by means of studs, as indicated in Figs. 29 and 30, there is supported a similar bar D⁹, such bars D⁸ and D⁹ comprising bearings for revolubly supporting the second series of folding rollers d³, the operation of which upon the partition strip is clearly indicated in Fig. 30, while Fig. 31 shows in cross section the partition strip n¹ after leaving the folding rolls d³, from which rolls they pass to the pasting and feeding mechanism next to be described.

Figure 32:
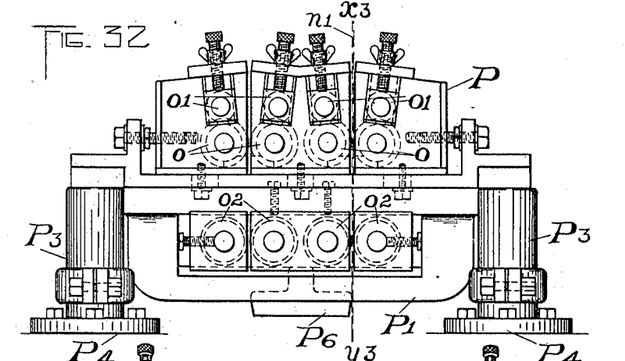
Fig. 32 is a front end view of the paste pot and the feeding rolls and the supporting sleeves, by means of which such mechanism is supported and operated from the actuating cams on the main shaft of the machine.

Similar systems of rolls to that just above described are supported on each side of the frame work D² by means of plates D⁴ secured thereto in order that the partition strips, supported as already described, on each side of such frame work D², may be treated alike and fed downwardly to and through the paste pot and between the continuous side walls of the blank B as folded up in the manner already described on each side of the center bed piece a. These partition strips n¹ after leaving the rollers just above described are on each side of the machine folded on the line of the central score therein and the attaching flaps are again straightened out so that such partition strips enter and pass downwardly between each coöperating pair of pasting rolls in double thickness. The pasting rolls o are revolubly supported in bearings in the end of the paste pot P, formed in three sections, as will be explained, and adjustably supported upon the frame work P¹ secured to the supporting and guiding rods P² by means of suitable clamping sockets P³. These rods P² work in suitable guideways P⁴ secured on the top of the frame work of the machine, while the lower ends of such rods P² are guided in suitable sockets, not seen, in the transverse cross pieces between the standards A¹. The paste pot comprises three sections, two outside ones and a central section, as indicated in Fig. 32, the right hand section being closed on its left hand side by the pasting rollers o and the wiping rollers o¹, while the central section is closed on both the left and right hand sides and the left hand section is closed on its right hand side by similar rolls.

Figure 33:
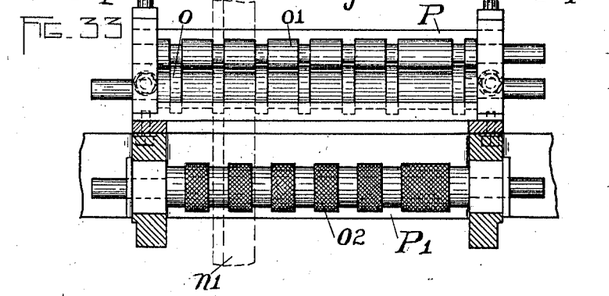
Fig. 33 is a section of the parts seen in Fig. 32 taken along the dotted lines $x^3$—$y^3$ with the parts at the left of such line removed.

The construction and operation of the pasting and feeding rolls is clearly indicated in Fig. 33. The pasting rolls, it will be noted, are enlarged to extend into grooves between enlarged sections on the wiping rolls, the operation being such that the paste is applied only to the outside surface of the folded back attaching flap and is prevented from contacting with the partition strip, except along the surface of the attaching flap, as clearly indicated in the case of one of such partition strips in dotted lines at n¹ in Fig. 33.

Figure 35:
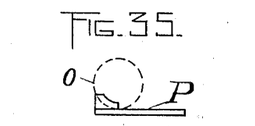
Fig. 35 shows the relation of one of such pasting rolls to the bottom of the paste pot.
Figure 36:
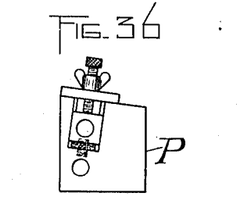
Fig. 36 shows in end view one section of the pasting pot.
Figures 37, 38, 39:
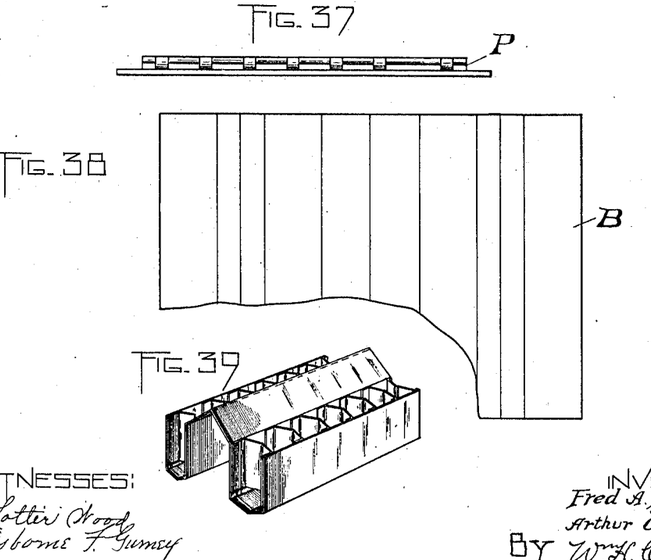
Fig. 37 is a side view of the portion of a bottom of the paste pot, as seen from the right in Fig. 35.
Fig. 38 is a face view of a scored up blank and Fig. 39 is a perspective view of the completed egg carrier as formed up by the machine.

In Fig. 37 there is seen the bottom of one of the outer paste pot sections on the side toward the partition strip n¹. From the bottom of the paste pot there extends upwardly for a short distance a side member which has grooves, as indicated in Figs. 35 and 37, to receive a portion of the periphery of the enlarged and paste applying sections of the pasting rollers o, the fit between these enlarged sections of the pasting rollers and the grooves in the upward projection from the bottom of the paste pot being such that no paste is permitted to escape between the rollers o and this upward extension from the bottom of the pot, whereby the paste is prevented from reaching the partition strip except as applied thereto by the enlarged portions of the pasting rollers o. Beneath the paste pot P there is supported in the frame work P¹ two coöperating pairs of knurled or corrugated feeding rollers o² adapted, by their enlarged and knurled sections, to feed and draw down, in the manner to be explained, the partition strips. These feed rollers o² constitute the only means for drawing the partition strips n¹ from the rolls D³ thereof and feeding them down at the proper time between the continuous side walls of the blank B⁴ on each side of the center bed piece a. Between the front and rear pairs of supporting and guiding rods P² there extend cross arms P⁵ adjustably secured to such rods P² and carrying a friction roller, as indicated in Figs. 4 and 17, adapted to be engaged by the cam s² on the shaft S in such a way that at the proper time the pasting and feeding mechanism is permitted to drop by gravity, in order that the clamping plate P⁶ carried by the frame work P¹ may rest upon and firmly hold the blank B when in the position indicated at B⁴ in Fig. 7, being its position for receiving the pasted partition strips between the partially folded and continuous side walls thereof.

Figure 42:
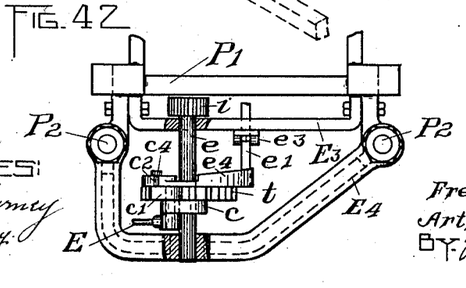
Fig. 42 shows a plan view of the frame work supported at the upper ends of the rear pair of reciprocating rods $P^2$, in which frame work is supported the bearings for the shaft $e$, parts of such frame work being broken away to show more clearly the bearings for such shaft.

Referring to Fig. 42, projecting to the rear of the frame work P¹ are seen ears carrying sockets engaging over the upper ends of the rods P², and a yoke member E⁴ is also supported from the upper ends of the rods P² by means of sockets or eyes engaging over such rods, and between the rearwardly extending ears on the frame work P¹ is secured the bar E³ and in this bar E³ and in the yoke member E⁴ are seen the bearings for the shaft e, the parts supported and operated thereby being also shown in plan view in Fig. 42. The plate P⁶ is cast integrally with the frame work P¹ and extends parallel with and above the bed a between the front and rear transverse members of this frame work P¹ as indicated in Figs. 1 and 32. This plate P⁶ carries fixed knives C having their cutting edges extending transversely out beyond the vertical side surfaces of the bed piece a, as indicated in Figs. 9 and 10, a sufficient distance to provide that the cutting edges of the jaw plates $C^1$ may completely sever the partition strips $n^1$ when the jaws $C^2$, carrying such combined knives and facing plates $C^1$, have been advanced in the manner to be explained, to the position indicated in Fig. 10, in which position also the continuous vertical side walls of the blank B have been firmly clamped together with the partitions $n$ severed from the strips $n^1$ thereof, as also indicated in Fig. 10. These jaw plates $C^2$ work in suitable guideways therefor supported by the frame work $A^4$ of the machine and are operated by means of the levers L pivotally supported between the ears $l$ extending downwardly from the frame work $A^4$ of the machine and connected by means of suitable hook links $l^1$, as indicated in Fig. 15, at their upper ends and with the jaw plates $C^2$ and at their lower ends making a yielding connection, with the eccentric strap $L^1$ encircling the cam $s^4$ secured upon the shaft S, the construction being such that by reason of the springs $l^2$, a heavy but yielding pressure may be exerted between the jaw plates $C^1$ and the opposing surfaces of the bed piece a sufficient to insure that the partitions $n$ are firmly attached to the inner surfaces of the vertical and continuous side walls of the blank B. The links $l^1$ may be, as indicated, disengaged from the jaws $C^2$ to permit the withdrawal of such jaws when desired. Between the opposite ears $l$, in order to relieve the strain upon the frame work of the machine, there extend tension bars $l^3$, as indicated in Figs. 1, 3 and 4.

Referring now to Figs. 6 and 42. Secured on the rear side of the bar $E^3$ secured on the rear end of the frame work for the paste pot and the pasting and feeding rolls is seen an ear $e^3$, so located that the lower horizontal member of the bent lever $e^1$, pivotally supported thereby, will lie practically over the center of the bed $a$ and such bed $a$ is grooved to receive such horizontal portion of the lever $e^1$ so that when there is no blank under the partition pasting and feeding mechanism, such horizontal portion of the lever $e^1$ may drop therein and throw the partition feeding clutch mechanism, to be explained, out of action, but a blank fed under such partition pasting and feeding mechanism engages under the forward end of such horizontal extension of the lever $e^1$ and lifts the same and thereby actuates the clutch mechanism for controlling the operation of the feeding rolls, and in this case the space between the fixed knives C on the member $P^6$ on the under side of the frame of the pasting and feeding mechanism is provided in which the lower horizontal member of this lever $e^1$ may freely enter so as to prevent injury to the blank.

Figure 34:
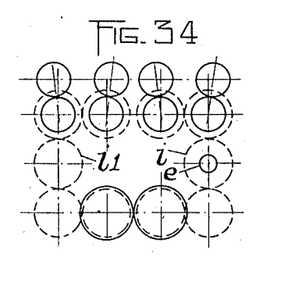
Fig. 34 shows diagrammatically the arrangement of the gears for actuating the rolls in the pasting and feeding mechanism.

Refer now to Figs. 6, $6^a$, $6^b$ and 42.—From the pivotal point of this lever $e^1$ in the ear $e^3$ such lever extends to the left, as seen in Figs. 6 and 42, and has secured on its left hand end a curved plate $e^4$, the curvature of which is practically that of the periphery of the ratchet wheel $t$ carried on the shaft $e$. This shaft $e$ carries on its right hand end a gear $i$, seen in Figs. 6, 34 and 42, meshing with coöperating gears to be explained. A lever E, as seen in Figs. 1 and 4, is pivoted at its right hand end to the lower part of the frame $A^1$ of the machine and has pivotally secured at its left hand end the lower end of a rod $E^2$ and a spring $E^1$. This spring $E^1$ is secured at its upper end to a lug on the rear of the frame work $A^1$ and normally holds the lever $E^1$ in its uppermost position, as seen in Fig. 4. A cam $s^3$ on the shaft S forces the lever E down by engaging the roller carried by such lever. The rod $E^2$ is pivotally supported at its upper end on a pin $c^3$. One end of a crank $c$ is supported on this pin $c^3$ and at its other end engages loosely around the shaft $e$ to permit the rotation of such shaft therein. Next to this crank $c$ on the pin $c^3$ is a pawl $c^1$. This pawl is arranged to engage the ratchet wheel $t$ on the shaft $e$. The rotation of the ratchet wheel $t$ by means of the lever E and the rod $E^2$, the crank $c$ and pawl $c^1$, causes the rotation of the shaft $e$ and the gear $i$ thereon. As seen in Fig. 34, the intermeshing of this gear $i$ with the gears on the pasting rolls and feeding rolls causes the same to rotate and feed the partition strips $n^1$ down the required distance between the side walls of the blank in the position shown at $B^4$. The operation of the lever $e^1$ is such that when a blank in the position indicated at $B^3$ in Fig. 7, engages underneath the spring $e^2$ on the right hand end of such lever $e^1$ and forces this end of the lever up, the plate $e^4$ is forced against the ratchet wheel $t$. On the outer end of the pawl $c^1$ is a pin $c^2$, which has an enlarged circular head $c^4$. When the blank is underneath the right hand end of the lever $e^1$ and the plate $e^4$ is against the ratchet $t$, this pin $c^2$ rolls over the plate $e^4$ and allows the pawl $c^1$ to engage the teeth on the ratchet $t$. When, however, there is no blank underneath the end of the lever $e^1$, the lever drops by gravity and the plate $e^4$ is drawn away from the ratchet wheel $t$, as shown in Fig. $6^b$, the result is that when the pawl is up and the plate $e^4$ is in the position just described, the enlarged head $c^4$ on the pin $c^2$ rolls upon this plate $e^4$ and holds the pawl out of engagement with the ratchet wheel $t$, and it will thus be seen that the partition strips $n^1$ can not be fed downward unless there is a blank about to be placed in the position indicated at $B^4$ in Fig. 7.

Refer now to Fig. 34. In this figure the full circles indicate in diagram the pitch lines of the gears on the ends of the rollers in the pasting and feeding mechanism toward the front end of the machine, and the dotted circles indicate the pitch lines of the gears on the rear ends of such rollers and on short operating shafts supported in the frame work of the pasting and feeding mechanism at the rear end thereof, and also the intermediate coöperating gears used to actuate such rollers and shafts. The ratchet wheel $t$ is secured on the shaft $e$ on which there is also secured a gear $i$. This gear $i$ meshes with a gear immediately above it on the rear end of the right hand one of the right hand pair of pasting rolls, which last named gear also meshes with a similar gear on the rear end of the left hand one of the right hand pair of pasting rolls. The gear $i$ also meshes with a gear on the rear end of the right hand one of the right hand pair of feeding rolls, which in turn meshes with a similar gear on the rear end of the left hand one of the right hand pair of feeding rolls. On the front end of this left hand one of the right hand pair of feeding rolls, there is a gear, indicated in full lines, which meshes with a similar gear on the front end of the right hand one of the left hand pair of feeding rolls, and on the rear end of this last named roll there is a gear, indicated in dotted lines, which meshes with a similar gear on the rear end of the left hand one of the left hand pair of feeding rolls, and from this last named gear, by means of the intermediate gear $i^1$, rotation is communicated to the left hand one of the left hand pair of pasting rolls and from which last named roll the right hand one of this left hand pair of pasting rolls is driven in the manner indicated in diagram. On the front end of each pasting roll there is located a gear, as indicated in full circles in the upper part of this figure meshing with a similar gear on the front end of each coöperating wiping roll, whereby each of such wiping rolls is driven directly from its corresponding pasting roll. The paste box P being supported from and upon the frame work $P^1$ must of necessity be carried with such frame work $P^1$ as the same is moved up and down in the manner already described in the operation of the machine,—such reciprocation however, of the paste box has no effect upon the feeding mechanism of the machine, but results from its direct support on and connection with the frame work $P^1$.

The operation of my machine is as follows:—The blanks B are placed in the receptacle therefor $R^3$ and the pulley T is driven by means of a belt in the usual way and the machine is put in motion by the clutch lever $p$ and the shaft S, by means of the gearing connections thereto already described, is caused to revolve. The reciprocating blank feeder $r^5$ feeds the blanks one at a time to the corrugating feeding rolls R and $R^1$ which in turn deliver the blanks to the rolls $r^7$ and $r^8$ and between the guides $a^2$. Such blanks are then engaged and advanced by means of the fingers Q from the position indicated at $B^1$ in Fig. 7 to the position indicated at $B^2$, where such blanks are operated on by the folding mechanism illustrated in Figs. 11, 12 and 42 and already fully described, from which position, when thus folded, they are advanced by the fingers $q$ to the position indicated at $B^3$ in Fig. 7, from which last position they are advanced by the forward fingers $z$ to the position indicated at $B^4$ in Fig. 7, directly under the partition strip pasting and feeding mechanism and by means of the rolls $o^2$ actuated by the clutching mechanism illustrated in Figs. 6, $6^A$, $6^B$ and 42 already fully described, the partition strips are drawn from the rolls $D^3$ thereof downwardly between the scoring rollers $d$ and the coöperating pressure rollers $d^1$, then downwardly through and between the folding rollers $d^2$, thence downwardly through and between the folding rollers $d^3$, such partition strips $n^1$ having of course been folded on their center line with the attaching flaps straightened out and they are then advanced downwardly between the continuous side walls of the blank each the proper distance to constitute the completed and foldable partition between such side walls, each such act of advancement taking place when the clamping jaws $C^2$ are in the position shown in Fig. 9 and while the pasting and feeding mechanism and the frame work $P^1$ supporting the same occupies its uppermost position, thereupon the partition strip pasting and feeding mechanism is lowered to firmly clamp the blank upon the upper surface of the bed piece $a$ and the clamping jaws $C^2$ are forced inwardly, the upper edges of the jaw plates $C^1$—$C^1$ severing the partitions from the strips thereof $n^1$ and forcing the continuous side walls of the blank together with the pasted partition strips between them, after which the jaws are again withdrawn from the position indicated in Fig. 10 to the position indicated in Fig. 9 and the completed egg carrier is, by means of the rear fingers $z^2$ on the bars $f$, ejected from the machine, being moved from the position indicated at $B^4$ to the position indicated at $B^5$ in Fig. 7. The reciprocating parts of our machine are so timed as to their operation as not to interfere with each other and as to operate upon the blanks, in the successive stages in the manner above described.

What we claim is:—

1. In a machine of the class described, relatively movable jaws for receiving and holding a blank with the side walls thereof spaced apart and the connecting bottom partially folded and depressed from its normal plane; means for feeding the blanks, one at a time in such folded form, to and between such jaws; means for feeding the partitions in folded form between the side walls of the blank and with their attaching flaps opposed thereto; means for rendering the attaching flaps of the partitions adhesive; means for actuating the jaws to clamp the side walls of such blank together with the partitions between them; means for opening such jaws to release the blank and means for ejecting the blank therefrom.

2. In a machine of the class described, relatively movable jaws for receiving and holding a blank with the side walls thereof spaced apart and the connecting bottom partially folded and depressed from its normal plane; means for feeding the blanks, one at a time in such folded form, to and between such jaws; means under the control of a blank between such jaws for feeding the partitions in folded form between the side walls of the blank and with their attaching flaps opposed thereto; means for rendering the attaching flaps of the partitions adhesive; means for actuating the jaws to clamp the side walls of such blank together with the partitions between them; means for opening such jaws to release the blank and means for ejecting the blank therefrom.

3. In a machine of the class described, relatively movable jaws for receiving and holding a blank with the side walls thereof spaced apart and the connecting bottom partially folded and depressed from its normal plane; means for feeding the blanks, one at a time in such folded form, to and between such jaws; means for supporting a series of partition strips; means for scoring and for folding such partition strips; means for rendering the attaching flaps of the partitions adhesive; means for advancing the folded partition strips between the side walls of the blank with their attaching flaps opposed thereto; means for severing the partitions from the strips thereof; means for actuating the jaws to clamp the side walls of such blank together with the partitions between them; means for opening such jaws to release the blank and means for ejecting the blank therefrom.

4. In a machine of the class described, relatively movable jaws for receiving and holding a blank with the side walls thereof spaced apart and the connecting bottom partially folded and depressed from its normal plane; means for feeding the blanks, one at a time in such folded form, to and between such jaws; means for supporting a series of partition strips; means for scoring and for folding such partition strips; means for rendering the attaching flaps of the partitions adhesive; means under the control of a blank between such jaws for advancing the partition strips between the side walls of the blank with their attaching flaps opposed thereto; means for severing the partitions from the strips thereof; means for actuating the jaws to clamp the side walls of such blank together with the partitions between them; means for opening such jaws to release the blank and means for ejecting the blank therefrom.

5. In a machine of the class described, relatively movable jaws for receiving and holding a blank with the side walls thereof spaced apart and the connecting bottom partially folded and depressed from its normal plane; mechanism for folding the blanks; means for feeding the blanks, one at a time in such folded form, to and between such jaws; means for feeding the blanks one at a time to such folding mechanism; means for feeding the partitions in folded form between the side walls of the blank and with their attaching flaps opposed thereto; means for rendering the attaching flaps of the partitions adhesive; means for actuating the jaws to clamp the side walls of such blank together with the partitions between them; means for opening such jaws to release the blank and means for ejecting the blank therefrom.

6. In a machine of the class described, relatively movable jaws for receiving and holding a blank with the side walls thereof spaced apart and the connecting bottom partially folded and depressed from its normal plane; mechanism for folding the blanks; means for feeding the blanks, one at a time in such folded form, to and between such jaws; means for feeding the blanks one at a time to such folding mechanism; means under the control of a blank between such jaws for feeding the partitions in folded form between the side walls of the blank and with their attaching flaps opposed thereto; means for rendering the attaching flaps of the partitions adhesive; means for actuating the jaws to clamp the side walls of such blank together with the partitions between them; means for opening such jaws to release the blank and means for ejecting the blank therefrom.

7. In a machine of the class described, relatively movable jaws for receiving and holding a blank with the side walls thereof spaced apart and the connecting bottom partially folded and depressed from its normal plane; mechanism for folding the blanks; means for feeding the blanks, one at a time in such folded form, to and between such jaws; means for feeding the blanks one at a time to such folding mechanism; means for supporting a series of partition strips; means for scoring and for folding such partition strips; means for rendering the attaching flaps of the partitions adhesive; means for advancing the folded partition strips between the side walls of the blank with their attaching flaps opposed thereto; means for severing the partitions from the strips thereof; means for actuating the jaws to clamp the side walls of such blank together with the partitions between them; means for opening such jaws to release the blank and means for ejecting the blank therefrom.

8. In a machine of the class described, relatively movable jaws for receiving and holding a blank with the side walls thereof spaced apart and the connecting bottom partially folded and depressed from its normal plane; mechanism for folding the blanks; means for feeding the blanks, one at a time in such folded form, to and between such jaws; means for feeding the blanks one at a time to such folding mechanism; means for supporting a series of partition strips; means for scoring and for folding such partition strips; means for rendering the attaching flaps of the partitions adhesive; means under the control of a blank between such jaws for advancing the partition strips between the side walls of the blank with their attaching flaps opposed thereto; means for severing the partitions from the strips thereof; means for actuating the jaws to clamp the side walls of such blank together with the partitions between them; means for opening such jaws to release the blank and means for ejecting the blank therefrom.

9. In a machine of the class described, relatively movable jaws for receiving and holding a blank with the side walls thereof spaced apart and the connecting bottom partially folded and depressed from its normal plane; mechanism for folding the blanks; means for feeding the blanks, one at a time in such folded form, to and between such jaws; means for scoring and for feeding the blanks, one at a time, to such folding mechanism; means for feeding the partitions in folded form between the side walls of the blank and with their attaching flaps opposed thereto; means for rendering the attaching flaps of the partitions adhesive; means for actuating the jaws to clamp the side walls of such blank together with the partitions between them; means for opening such jaws to release the blank and means for ejecting the blank therefrom.

10. In a machine of the class described, relatively movable jaws for receiving and holding a blank with the side walls thereof spaced apart and the connecting bottom partially folded and depressed from its normal plane; mechanism for folding the blanks; means for feeding the blanks, one at a time in such folded form, to and between such jaws; means for scoring and for feeding the blanks, one at a time, to such folding mechanism; means under the control of a blank between such jaws for feeding the partitions in folded form between the side walls of the blank and with their attaching flaps opposed thereto; means for rendering the attaching flaps of the partitions adhesive; means for actuating the jaws to clamp the side walls of such blank together with the partitions between them; means for opening such jaws to release the blank and means for ejecting the blank therefrom.

11. In a machine of the class described, relatively movable jaws for receiving and holding a blank with the side walls thereof spaced apart and the connecting bottom partially folded and depressed from its normal plane; mechanism for folding the blanks; means for feeding the blanks, one at a time in such folded form, to and between such jaws; means for scoring and for feeding the blanks, one at a time, to such folding mechanism; means for supporting a series of partition strips; means for scoring and for folding such partition strips; means for rendering the attaching flaps of the partitions adhesive; means for advancing the folded partition strips between the side walls of the blank with their attaching flaps opposed thereto; means for severing the partitions from the strips thereof; means for actuating the jaws to clamp the side walls of such blank together with the partitions between them; means for opening such jaws to release the blank and means for ejecting the blank therefrom.

12. In a machine of the class described, relatively movable jaws for receiving and holding a blank with the side walls thereof spaced apart and the connecting bottom partially folded and depressed from its normal plane; mechanism for folding the blanks; means for feeding the blanks, one at a time in such folded form, to and between such jaws; means for scoring and for feeding the blanks, one at a time, to such folding mechanism; means for supporting a series of partition strips; means for scoring and for folding such partition strips; means for rendering the attaching flaps of the partitions adhesive; means under the control of a blank between such jaws for advancing the partition strips between the side walls of the blank with their attaching flaps opposed thereto; means for severing the partitions from the strips thereof; means for actuating the jaws to clamp the side walls of such blank together with the partitions between them; means for opening such jaws to release the blank and means for ejecting the blank therefrom.

13. In a machine of the class described; in combination with a support for the rolls of continuous partition strips; scoring rolls adapted to score the partitions along the lines of the foldable attaching flaps and along the center line; folding rolls adapted to fold such flaps down upon the body of the partition strips; pasting rolls adapted to clamp the partition strips folded upon their center line and with the flaps folded outermost and exposed to such pasting rolls, such pasting rolls adapted to apply adhesive material to such flaps only and coöperating with such pasting rolls wiping rolls adapted to prevent access of the adhesive material to the body of the partition strips, operating to wipe the excess of paste from the pasting rolls and having members adapted to engage between the pasting rolls and prevent escape of the adhesive therethrough.

14. In a machine of the class described; in combination with a support for the rolls of continuous partition strips; scoring rolls adapted to score the partitions along the lines of the foldable attaching flaps and along the center line; folding rolls adapted to fold such flaps down upon the body of the partition strips; pasting rolls adapted to clamp the partition strips folded upon their center line and with the flaps folded outermost and exposed to such pasting rolls, such pasting rolls adapted to apply adhesive material to such flaps only and coöperating with such pasting rolls wiping rolls adapted to prevent access of the adhesive material to the body of the partition strips, operating to wipe the excess of paste from the pasting rolls and having members adapted to engage between the pasting rolls and prevent escape of the adhesive therethough and feeding rolls adapted to engage the body of the partition strips and advance them through such pasting rolls.

15. In a machine of the class described; in combination with a support for the rolls of continuous partition strips; scoring rolls adapted to score the partitions along the lines of the foldable attaching flaps and along the center line; folding rolls adapted to fold such flaps down upon the body of the partition strips; pasting rolls adapted to clamp the partition strips folded upon their center line and with the flaps folded outermost and exposed to such pasting rolls, such pasting rolls adapted to apply adhesive material to such flaps only; coöperating with such pasting rolls wiping rolls adapted to prevent access of the adhesive material to the body of the partition strips, operating to wipe the excess of paste from the pasting rolls and having members adapted to engage between the pasting rolls and prevent escape of the adhesive therethrough; feeding rolls adapted to engage the body of the partition strips and advance them through such pasting rolls and operative connections between such feeding rolls and such pasting rolls adapted to rotate such rolls at the same peripheral speed.

16. In a machine of the class described, in combination with a support for the rolls of continuous partition strips and means for folding the strips as they are fed therefrom, pasting rolls adapted to clamp the partition strips folded upon their center lines and with the flaps folded outermost and exposed to such pasting rolls, such pasting rolls adapted to apply adhesive material to such flaps only, and coöperating with such pasting rolls wiping rolls adapted to prevent access of the adhesive material to the body of the partition strips, operating to wipe the excess of paste from the pasting rolls and having members adapted to engage between the pasting rolls and prevent escape of the adhesive therethrough and means for coöperatively rotating such pasting and wiping rolls.

17. In a machine of the class described, in combination with a support for the rolls of continuous partition strips, means for folding the strips as they are fed therefrom; pasting rolls adapted to clamp the partition strips folded upon their center lines and with the flaps folded outermost and exposed to such pasting rolls, such pasting rolls adapted to apply adhesive material to such flaps only; coöperating with such pasting rolls wiping rolls adapted to prevent access of the adhesive material to the body of the partition strips, operating to wipe the excess of paste from the pasting rolls and having members adapted to engage between the pasting rolls and prevent escape of the adhesive therethrough and feeding rolls adapted to engage the body of the partition strips and advance them through such pasting rolls.

18. In a machine of the class described, in combination with a support for the rolls of continuous partition strips, means for folding the strips as they are fed therefrom; pasting rolls adapted to clamp the partition strips folded upon their center lines and with the flaps folded outermost and exposed to such pasting rolls, such pasting rolls adapted to apply adhesive material to such flaps only, coöperating with such pasting rolls wiping rolls adapted to prevent access of the adhesive material to the body of the partition strips, operating to wipe the excess of paste from the pasting rolls and having members adapted to engage between the pasting rolls and prevent escape of the adhesive therethrough; feeding rolls adapted to engage the body of the partition strips and advance them through such pasting rolls and operative connections between such feeding rolls and such pasting rolls adapted to rotate such rolls at the same peripheral speed.

19. In a machine of the class described, in combination with a support for the rolls of continuous partition strips, means for folding the strips as they are fed therefrom; a paste box having revolubly supported therein coöperating and intermeshing series of pasting rolls and wiping rolls, the axis of one series being parallel with that of the other, such paste box being closed on one side by such series of pasting and wiping rolls coöperating to prevent the escape between them, of paste from the box and feeding rolls adapted to engage the body of the partition strips and advance them through such pasting rolls.

20. In a machine of the class described, mechanism for folding the blanks comprising supports for the side walls of the completed case; a plunger coöperating therewith to force the blank between such side supports with the bottom member connecting the sides of the case partially folded and depressed from its normal plane and with such side walls correspondingly spaced apart and means for feeding the partition strips between the side walls of the blank and securing them thereto.

21. In a machine of the class described, in combination with a support for the rolls of continuous partition strips, means for folding the strips as they are fed therefrom; a paste box having revolubly supported therein coöperating and intermeshing series of pasting rolls and wiping rolls, the axis of one series being parallel with that of the other, such paste box being closed on one side by such series of pasting and wiping rolls coöperating to prevent the escape between them, of paste from the box and means for coöperatively rotating such pasting and wiping rolls.

22. In a machine of the class described, in combination with a paste box having revolubly supported therein coöperating and intermeshing series of pasting rolls and wiping rolls, the axis of one series being parallel with that of the other, such paste box being closed on one side by such series of pasting and wiping rolls coöperating to prevent the escape between them, of paste from the box and means for advancing the partitions to and through such pasting rolls.

FRED A. PURCHAS.
ARTHUR C. LA MAY.

Witnesses to signature of Fred A. Purchas:
B. T. BURLINGHAM,
C. E. SWEET.

Witnesses to signature of Arthur C. La May:
OSBORNE F. GURNEY,
LOTTIE WOOD.